United States Patent [19]
Maloney et al.

[11] Patent Number: 5,679,926
[45] Date of Patent: Oct. 21, 1997

[54] SLEEVE RETAINER FOR SENSOR

[75] Inventors: David Martin Maloney, Grand Blanc; Matthew Zimmermann, Brighton, both of Mich.

[73] Assignee: General Motors Corporation, Detroit, Mich.

[21] Appl. No.: 605,570

[22] Filed: Feb. 22, 1996

[51] Int. Cl.[6] .................................................. H02G 3/18
[52] U.S. Cl. ........................ 174/65 R; 174/84 C; 285/256; 285/319
[58] Field of Search ........................ 174/65 R, 65 SS, 174/78, 72 A, 74 A, 84 C, 93; 285/256, 257, 319, 331; 403/329, 326

[56] References Cited

U.S. PATENT DOCUMENTS

| | | | |
|---|---|---|---|
| 3,424,853 | 1/1969 | Johnson, III | 174/65 R X |
| 4,214,779 | 7/1980 | Losell | 285/319 X |
| 4,978,149 | 12/1990 | Sauer | 285/256 |
| 5,039,139 | 8/1991 | McElroy et al. | 285/319 |
| 5,040,829 | 8/1991 | Sauer | 285/319 X |
| 5,080,404 | 1/1992 | Sauer | 285/319 X |
| 5,109,603 | 5/1992 | Boulanger | 174/65 R X |

*Primary Examiner*—Kristine L. Kincaid
*Assistant Examiner*—Dean A. Reichard
*Attorney, Agent, or Firm*—Kathryn A. Marra

[57] ABSTRACT

A sensor assembly includes a sensor including a mating feature disposed thereon. The sensor assembly also includes a harness having a protective sleeve including a sleeve end. The sensor assembly further includes a sleeve retainer connected to the sleeve end. The sleeve retainer includes a plurality of inwardly projecting spring tabs adapted to snap-fittedly engage the mating feature on the sensor to connect the sleeve retainer and harness to the sensor. Upon axial movement of the sleeve retainer over the sensor, the spring tabs snap-fittedly engage the mating feature on the sensor and hold the protective sleeve in position relative the sensor.

7 Claims, 9 Drawing Sheets

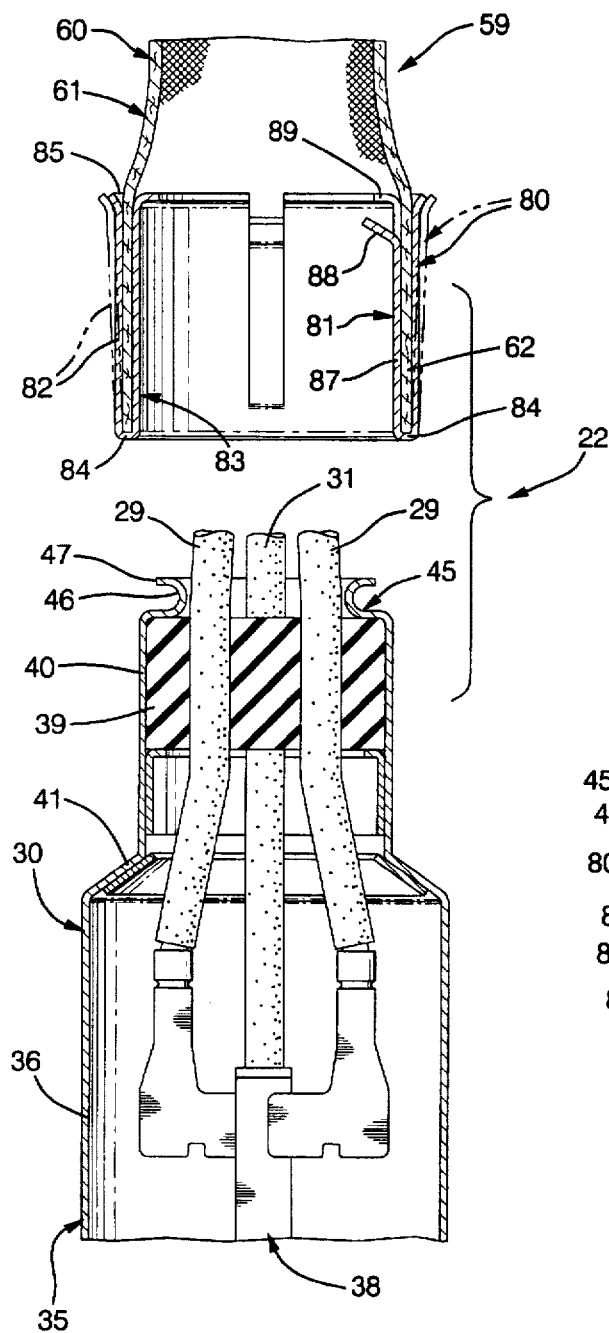
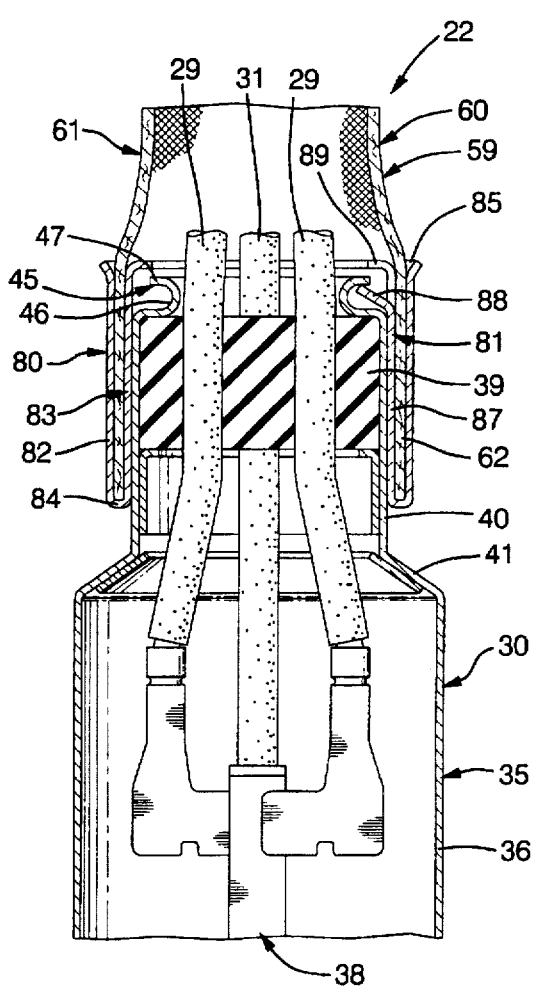
FIG. 4A
FIG. 4B

SLEEVE RETAINER FOR SENSOR

This invention relates to a sensor assembly having a harness and a sensor, and more particularly to attachment of a protective sleeve of the harness to the sensor.

BACKGROUND OF THE INVENTION

It is well known to use oxygen sensors in various locations in a vehicle. Some sensors are installed in the exhaust manifold where protection from environmental elements such as water and debris under the vehicle is good. Other sensors are mounted in locations along the exhaust pipe that expose the sensor to the environmental elements encountered under the vehicle. Thus, the sensor and its accompanying wires need to be protected from these elements.

FIGS. 1 and 2A–2C show a prior art oxygen sensor assembly 10. A sensor 16 is mounted on an exhaust pipe 11 under the vehicle. The sensing element (not shown) is typically located in a shell housing 13 similar to that of a spark plug. An upper shield 14 is welded to the shell housing 13 to form the sensor 16. Wires 15 extend upwardly and out through the upper shield 14. The sensor assembly 10 also includes a harness 17 having a protective sleeve 18 which is connected to an electrical connector at one end and is attached to the upper shield 14 at the other end. The protective sleeve 18 encases the wires 15 and protects them from exposure to the environmental elements. The harness 17, including the wires is and the upper shield 14 loosely connected thereto, is typically made at a location different from where the sensor 16 is made. Thus, the welding of the upper shield 14 to the shell housing to form the sensor 16 takes place first and the assembly of the harness 17 to the sensor 16 to form the sensor assembly 10 is performed later at a sensor assembly location.

In the prior art, the attachment of an end 19 of the protective sleeve 18 to the upper shield 14 is accomplished with a metal crimp ring 20. With reference to FIGS. 2A–2C, the protective sleeve 18 is assembled to the upper shield 14 as follows. As shown in FIG. 2A, the sensor assembly 10 is handled as three separate components: the harness 17 including the protective sleeve 18, the crimp ring 20, and the sensor 16 including the welded-on upper shield 14. At the assembly location, the protective sleeve 18 is placed over the top end of the upper shield 14. The crimp ring 20 is then positioned over the protective sleeve 18 and the upper shield 14 as shown in FIG. 2B. The three separate components must be aligned and held in this position while the crimp ring 20 is crimped in place as shown in FIG. 2C. After the crimp ring 20 is crimped, the crimp ring 20, protective sleeve 18 and upper shield 14 are held in position relative each other.

The prior art attachment of the protective sleeve 18 to the upper shield 14 has the shortcoming of being somewhat difficult to assemble. The protective sleeve 18 is made of a plastic, springy, woven material which has a tendency to move on the upper shield 14 when it is pulled into position. The crimp ring 20 can also move around on the protective sleeve 18 prior to crimping and it is difficult for the assembler to consistently align the components for crimping. Also, the protective sleeve 18 may bunch up on the upper shield 14 during the crimping process which is not visually desirable. In addition, the portion of the protective sleeve 18 which extends beneath the crimp ring 20 after crimping, has a tendency to fray and unravel which is not visually desirable and which could interfere with later assembly operations. It is also a shortcoming that the three components must be crimped together by, a tooling process at the assembly location where the sensor 16, the crimp ring 20 and the harness 17 are finally joined together.

SUMMARY OF THE INVENTION

The present invention provides an improved sensor assembly which is easy to assemble. Advantageously, the protective sleeve is manually attached to the sensor without the use of tools at final assembly when the harness and the sensor are joined together. The present invention also preferably provides an aesthetically pleasing sensor assembly in which bunching up and fraying or unraveling of the end of the sleeve is virtually eliminated. The present invention also provides a secure attachment of the sleeve to the sensor while taking up little space to permit access for serviceability of the sensor.

These advantages and others are accomplished in the present invention by providing a sensor assembly including a sensor including a mating feature disposed thereon. The sensor assembly also includes a harness having a protective sleeve including a sleeve end. The sensor assembly further includes a sleeve retainer connected to the sleeve end. The sleeve retainer includes a plurality of inwardly projecting spring tabs adapted to snap-fittedly engage the mating feature on the sensor to connect the sleeve retainer and harness to the sensor. Upon axial movement of the sleeve retainer over the sensor, the spring tabs snap-fittedly engage the mating feature on the sensor and hold the protective sleeve in position relative the sensor.

Preferably, the mating feature is an indentation on the sensor capable of receiving the spring tabs therein. In other preferred forms, the mating feature may be an annular groove or an annular groove terminating in an outwardly projecting lip. An upper shield may be disposed on the sensor and the mating feature may be disposed on the upper shield. Preferably, the spring tabs each include an inwardly projecting tip seated in the mating feature of the sensor when the sleeve retainer is connected to the sensor.

In another preferred form of the invention, the sleeve retainer includes inner and outer walls forming a trough in which the sleeve end of the protective sleeve is captured to attach the sleeve retainer to the protective sleeve of the harness. The plurality of inwardly projecting spring tabs may be integrally formed on the inner wall of the sleeve retainer. Preferably, the inner wall of the sleeve retainer includes an uppermost end having an inwardly projecting lip thereon that limits axial movement of the sleeve retainer over the sensor to position the sleeve retainer relative to the sensor and to ensure that the spring tabs engage the mating feature.

In accordance with another preferred aspect, a method of assembling the harness having the protective sleeve including the sleeve end to the sensor includes the steps of providing a sleeve retainer, attaching the sleeve retainer to the sleeve end, and snapping the sleeve retainer with the sleeve end already attached thereto onto the sensor.

BRIEF DESCRIPTION OF THE DRAWINGS

FIG. 4A is a sectional view of an enlargement of the view shown in FIG. 3 with a sleeve retainer shown in the crimped condition in solid lines and in the uncrimped condition in phantom lines;

FIG. 4B is a sectional view similar to FIG. 4A, but showing the sensor assembly in the fully assembled condition;

DESCRIPTION OF THE PREFERRED EMBODIMENT

Figure 1:
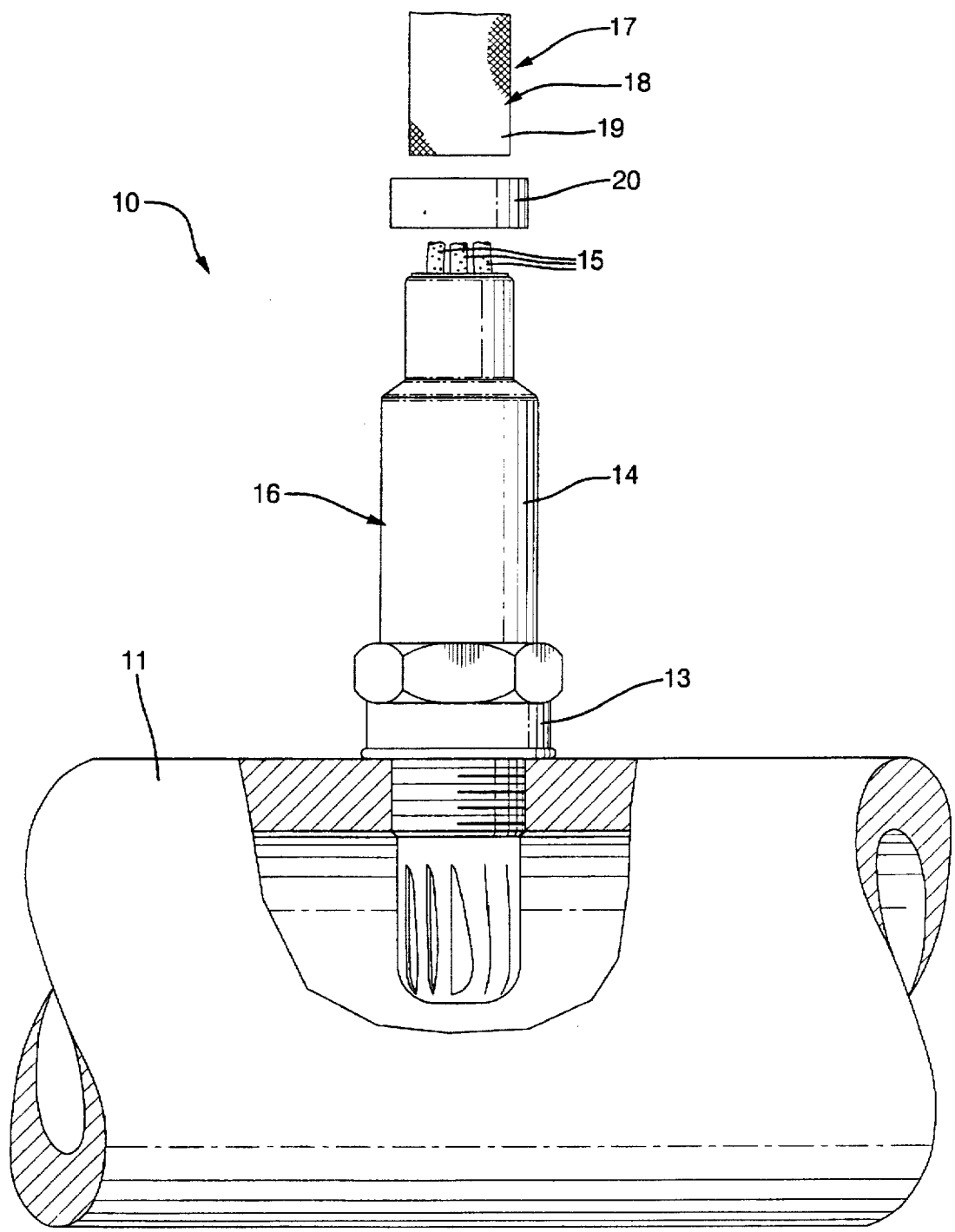
FIG. 1 shows a partially exploded view of a prior art oxygen sensor assembly with the sensor mounted in an exhaust pipe partially-broken-away.
Figure 2A:
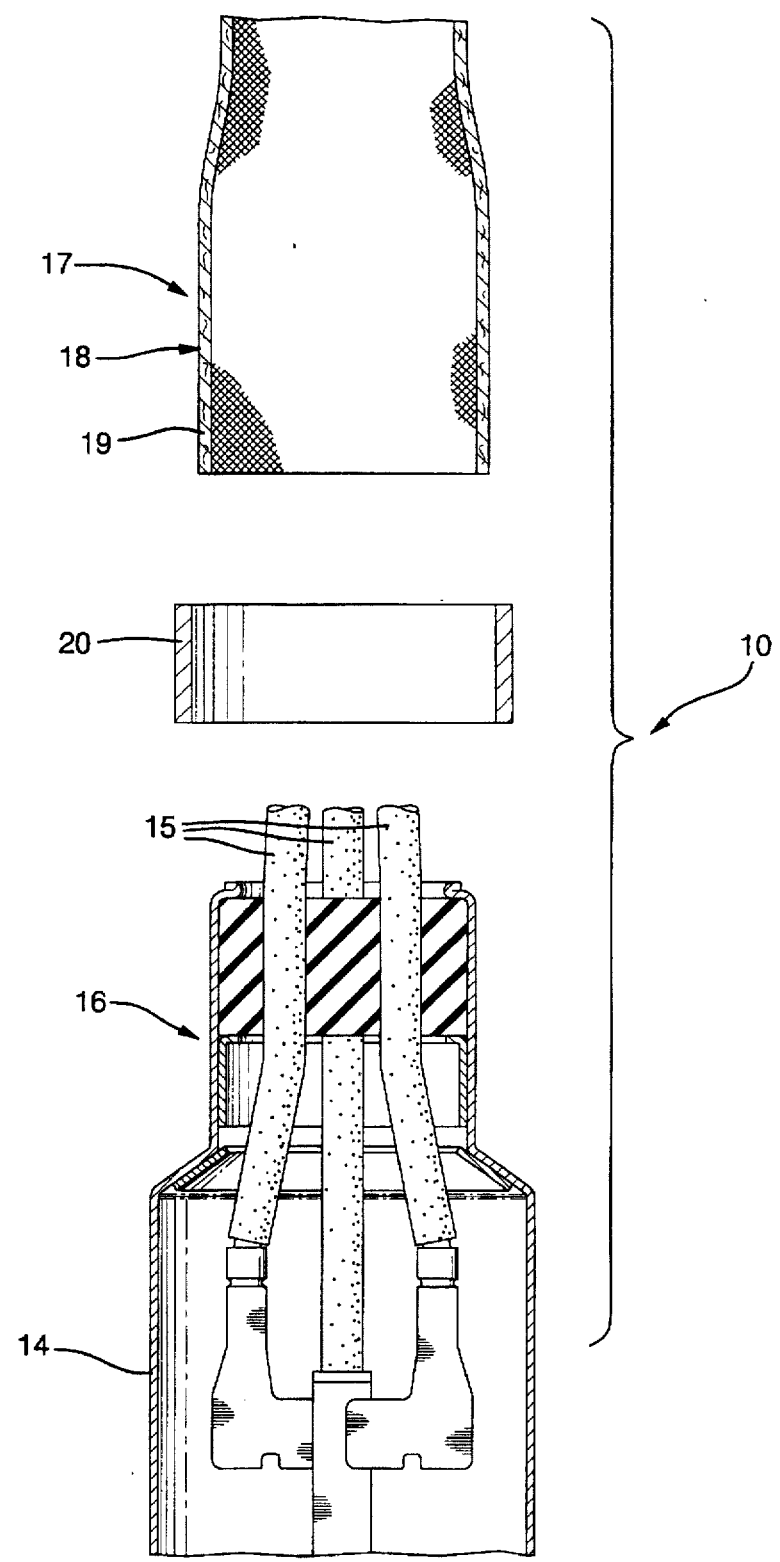
FIG. 2A is a sectional view of an enlargement of the view of the prior art in FIG. 1.
Figure 2B:
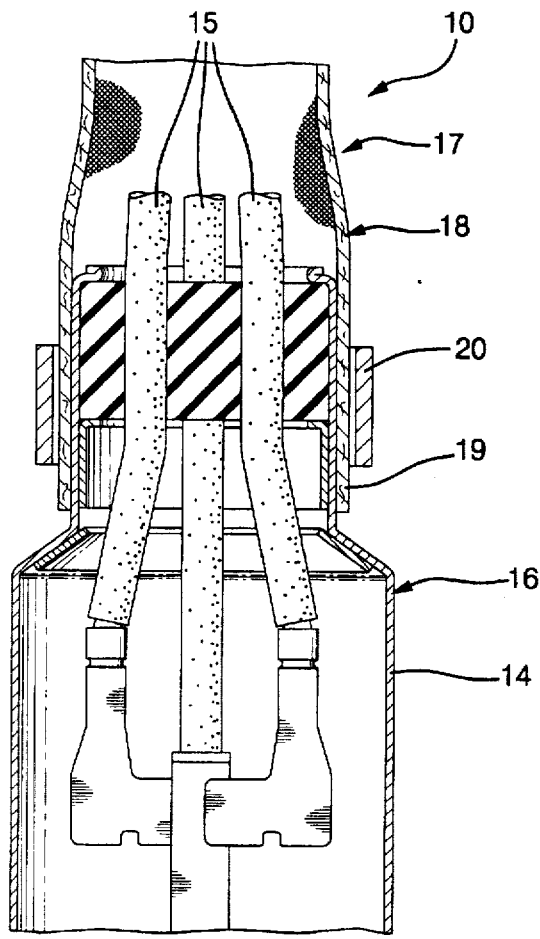
FIG. 2B is a sectional view of the prior art, similar to FIG. 2A, but showing the sensor assembly in the partially assembled condition prior to a crimp ring being crimped.
Figure 2C:
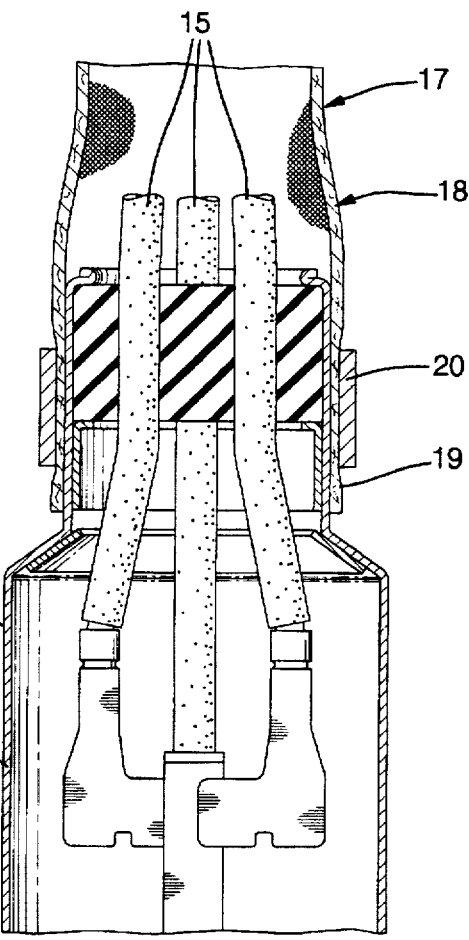
FIG. 2C is a sectional view of the prior art, similar to FIG. 2A, but showing the sensor assembly in the fully assembled condition with the crimp ring crimped.
Figure 3:
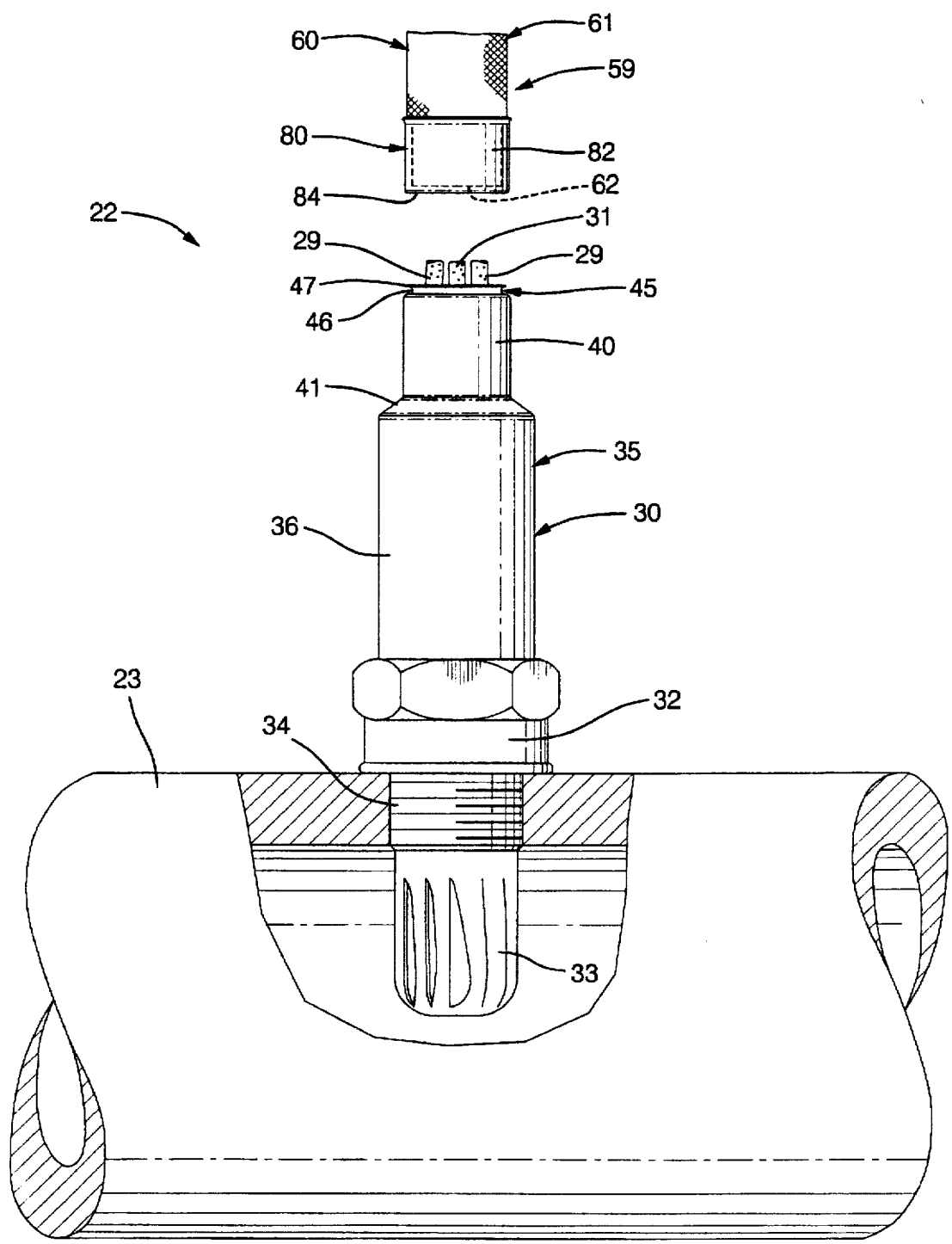
FIG. 3 is a partially exploded view of the sensor assembly showing an embodiment of the present invention with the exhaust pipe partially-broken-away.
Figure 5:
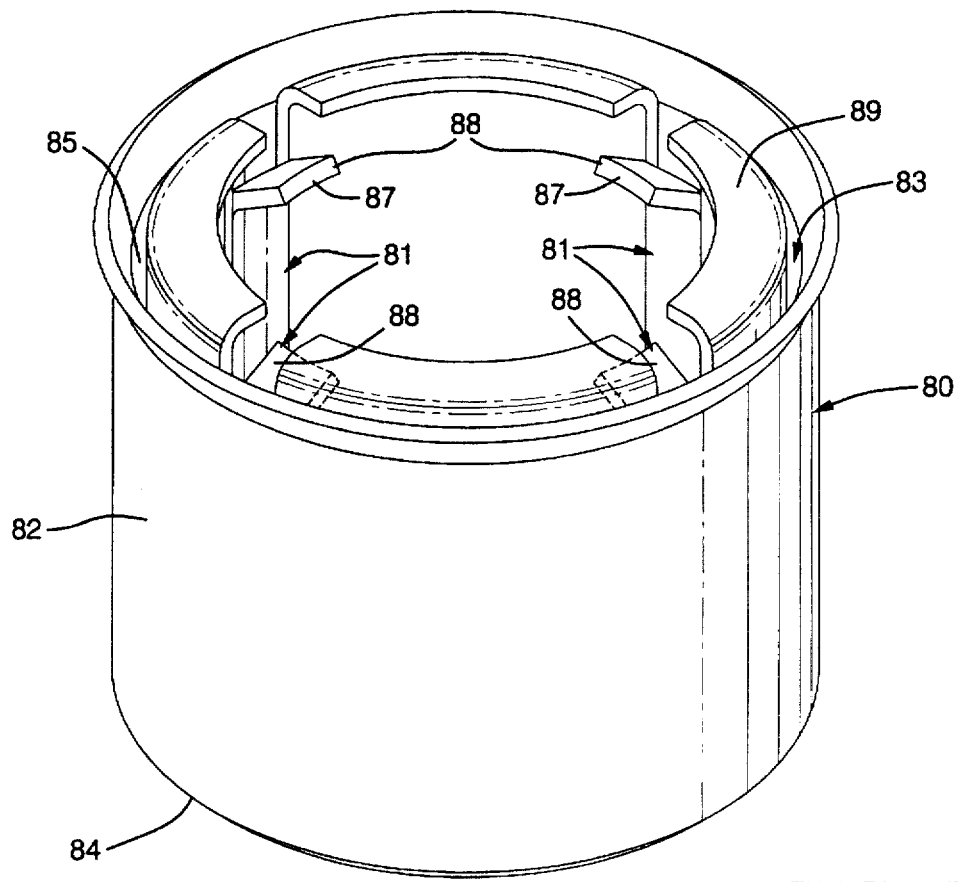
FIG. 5 is a perspective view of the sleeve retainer.

Referring to FIGS. 3–6, an oxygen sensor assembly 22 includes the component parts of a sensor 30 including an upper shield 35, a harness 60 including a protective sleeve 61, and a sleeve retainer 80 connected to the sleeve 61 and for attaching the harness 60 to the sensor 30 to form the sensor assembly 22, as described further hereinafter. Referring to FIGS. 3 and 4A–4B, the oxygen sensor 30 is mounted to an exhaust pipe 23 underneath a vehicle in a post-converter location where the sensor 30 is exposed to many environmental elements such as water and road debris and also is subject to vehicle vibration. The sensor 30 is equipped to detect the exhaust gas constituency. A signal is generated by the sensor 30 and fed back to the vehicle control module (not shown) by a signal wire 31 to attenuate the engine's air and fuel mixture to optimize engine performance and emission levels. Although only one sensor 30 is shown, the vehicle may include many sensors 30 mounted in various locations along the exhaust system.

The sensor 30 includes a sensing element (not shown) which is protected by a shell housing 32 having a threaded portion 34 for attachment of the sensor 30 to the exhaust pipe 23. The sensor 30 also includes a lower shield 33. An upper shield 35 is attached to the shell housing 32, such as by laser welding a lower portion 36 of the upper shield 35.

The upper shield 35 houses a heating assembly 38 and the shell housing 32 houses the sensing element. A rubber seal 39 is encased at an upper portion 40 of the upper shield 35 and allows the signal wire 31 and other sensor wires 29 to pass out through the upper portion 40 of the upper shield 35. The upper shield 35 and rubber seal 39 cooperatively protect the internal components of the sensor 30 from exposure to the elements.

The upper shield 35 is preferably a single integral component made from a metallic material, such as stainless steel for good corrosion resistance. The upper portion 40 of the upper shield 35 preferably has a reduced diameter and shoulders 41 tapering radially outward to the lower portion 36 of the upper shield 35. As best shown in FIGS. 4A and 4B, the upper portion 40 of the upper shield 35 includes a mating feature 45 for engaging a plurality of spring tabs 81 on the sleeve retainer 80 as will be described further hereinafter. Preferably, the mating feature 45 includes an annular groove 46 located on an uppermost end of the upper shield 35. The annular groove 46 of the mating feature 45 preferably terminates in a radially outwardly projecting lip 47 beneath which the spring tabs 81 are trapped upon attachment of the sleeve retainer 80 to the upper shield 35. The outwardly projecting lip 47 is preferably formed by rolling over the uppermost end of the upper shield 35 above the annular groove 46. The outwardly projecting lip 47 preferably has an outer diameter which is smaller than an outer diameter of the upper portion 40 of the upper shield 35, but larger than a diameter of the annular groove As best shown in FIGS. 3–4B, the harness 60 surrounds the wires 29, 31 which extend out beyond the upper shield 35 and protects the wires 29, 31 from the elements. More specifically, the harness 60 includes the elongated, flexible, hollow protective sleeve 61 preferably made of a woven plastic material. The sleeve 61 has a sleeve end 62 connected to the upper shield 35 via the sleeve retainer 80, described in detail hereinafter. An opposite end (not shown) of the sleeve 61 is attached to an electrical connector for connection to the vehicle to transmit the signal from the sensor 30.

As best shown in FIGS. 4A–4B, 5 and 6A–6C, the sleeve retainer 80 is preferably a single integral component formed of a metallic material, such as stainless steel for good corrosion resistance. The sleeve retainer 80 generally has a cup-like shape and includes an outer wall 82, and a reverse draw that forms an inner wall 83 and an end wall 84. An upwardly opening circular trough 85 is cooperatively defined between the inner and outer walls 83, 82 with the end wall 84 closing the bottom of the trough 85. The inner wall 83 includes the plurality of integrally formed inwardly projecting spring tabs 81 which cooperatively snap the sleeve retainer 80 onto the sensor 30, as described further hereinafter. The spring tabs 81 each include an elongated portion 87 and an inwardly bent tip end 88 that snaps into the mating feature 45 on the sensor 30. Also, the inner wall 83 preferably includes an inwardly projecting lip 89 for limiting axial movement of the sleeve retainer 80 onto the sensor 30, as described further hereinafter. Preferably, the inner and outer walls 83, 82 have similar heights such that when the sleeve retainer 80 is mounted on the upper shield 35, the overall height of the sensor 30 with the sleeve retainer 80 attached thereto is approximately the same or only slightly increased over the sensor 30 alone so that additional clearance is not needed under the vehicle to mount the sensor assembly 22. It is also preferred that the height of the sleeve retainer 80 be minimized to reduce weight and material costs, while still securely capturing the sleeve end 62 therein. It will be appreciated that the trough 85 of the sleeve retainer 80 may include slots (not shown) to permit fluids or other contamination to drain out, especially through the end wall 84.

Figure 6A:
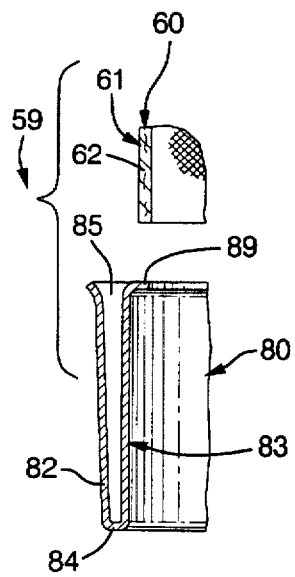
FIG. 6A is an exploded sectional view of a harness subassembly showing a sleeve end and the sleeve retainer, both partially-broken-away.
Figure 6B:
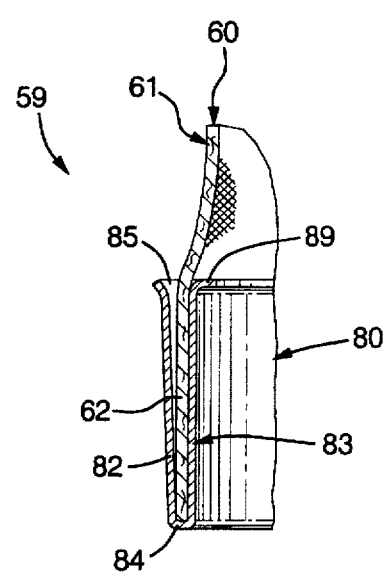
FIG. 6B is a sectional view similar to FIG. 6A, but showing the sleeve end inserted in the sleeve retainer prior to crimping the sleeve retainer.
Figure 6C:
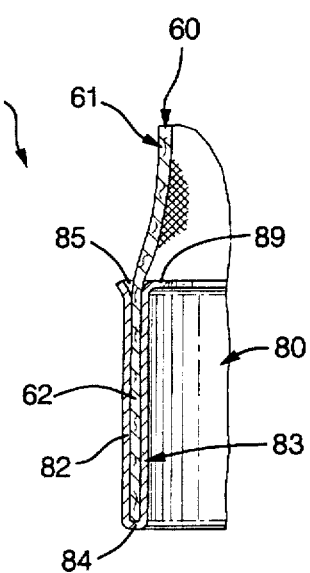
FIG. 6C is a sectional view similar to FIG. 6B, but showing the sleeve retainer in the crimped condition.

As best shown in FIGS. 6A–6C, a harness subassembly 59 includes the sleeve 61 and the sleeve retainer 80. The trough 85 is initially sized to easily receive the sleeve end 62 of the sleeve 61 therein as enabled by the initial radial spacing of the inner and outer walls 83, 82 shown in FIGS. 6A and 6B. To assemble the harness subassembly 59, the sleeve end 62 is axially inserted into the trough 85 as shown in FIG. 6B. Next, the outer wall 82 of the sleeve retainer 80 is pressed, crimped or otherwise formed inward so that the sleeve end 62 is pinched between the inner and outer walls 83, 82 of the sleeve retainer 80 and is securely captured in the trough 85. FIG. 4A shows the outer wall 82 before crimping in solid lines and after crimping in phantom lines. The sleeve retainer 80 with the sleeve end 62 therein shown in FIG. 6B may be placed on a fixture during crimping to maintain the dimensions of the inner wall 83. Preferably the outer wall 82 is crimped into a hex shape, however, it will be appreciated that any type of crimping, pressing, pinching, dimpling or trapping may be used to capture the sleeve end 62 securely between the walls 83, 82 of the sleeve retainer 80 to form the harness subassembly 59 including the sleeve 61 and the sleeve retainer 80.

Referring to FIG. 3, it will be appreciated that the sleeve end 62 captured in the sleeve retainer 80 is visually pleasing since the sleeve end 62 is hidden within the trough 85 and fraying and unraveling of the sleeve end 62 is virtually eliminated. It will further be appreciated that the harness 60 is also more visually pleasing since the sleeve end 62 does not bunch up upon insertion into the sleeve retainer 80. Also, the sleeve retainer 80 is more consistently positioned on the sleeve end 62 since only the sleeve retainer 80 and sleeve 61 need be aligned during the pressing or crimping operation. It will further be appreciated that the harness 60 with the upper shield 35 loosely connected thereto via the wires 29 is typically made at a separate location from the remainder of the sensor 30. Thus, the welding of the upper shield 35 to form the sensor 30 and the final assembly of the harness 60 to the sensor 30 to form the sensor assembly 22 is not performed until the sensor 30 and harness 60 are brought together, typically at the sensor assembly location. Advantageously, the sleeve retainer 80 is already attached to the sleeve 61 when the harness 60 arrives at the sensor assembly location. Thus, the sleeve retainer 80 and harness 60 can advantageously be manually be snapped onto the upper shield 35 of the sensor 30, as described below, without the use of tools to complete the sensor assembly 22. The sleeve retainer 80 of the present invention provides greater flexibility and ease when completing the sensor assembly 22 at the sensor assembly location.

Referring to FIGS. 4A and 4B, after welding the upper shield 35 to the shell housing 32 to form the sensor 30, the harness subassembly 59 including the sleeve retainer 80 and the sleeve end 62 are easily snap-fittedly attached to the sensor 30 without the use of tools as follows. The inner wall 83 of the sleeve retainer 80 has a diameter which is preferably sized either for surface to surface contact or a looser slip fit with the outer diameter of the upper portion 40 of the upper shield 35. The slip fit allows the sleeve retainer 80 to easily be manually assembled to the upper shield 35. A slight interference fit could also be used to prevent noise or rattle due to vehicle vibration. However, the noise and rattle is generally eliminated by the interference fit with the spring tabs 81. The harness 60 is received at the assembly location with the sleeve retainer 80 already attached, forming the harness subassembly 59. The sleeve retainer 80 is simply manually moved or pushed in a downward axial direction onto the upper shield 35 such that the spring tabs 81 engage the upper shield 35. The elongated portions 87 of the spring tabs 81 easily move past the mating feature 45 including the annular groove 46 and the outwardly projecting lip 47 on the uppermost end of the upper shield 35. Upon further axial movement, the inwardly bent tip ends 88 of the spring tabs 81 then snap into place beneath the outwardly projecting lip 47 of the mating feature 45 and into the annular groove 46. Further axial movement of the sleeve retainer 80 onto the sensor 30 is limited by the inwardly projecting lip 89 on the inner wall 83 of the sleeve retainer 80 such that the inwardly bent tip ends 88 of the spring tabs 81 cannot be pushed past the mating feature 45 on the sensor 30. Tactile verification that the harness 60 is securely mounted to the sensor 30 is cooperatively provided by the inwardly bent tip ends 88 of the spring tabs 81 snapping into place beneath the outwardly projecting lip 47 and the inwardly projecting lip 89 which limits axial movement.

It will be appreciated that the inwardly directed spring force of the spring tabs 81 on the sensor 30 should be low enough to allow for easy manual attachment, but stiff enough to maintain the connection between the sleeve retainer 80 and the upper shield 35. While four relatively narrow spring tabs 81 are shown in the preferred embodiment, more or fewer spring tabs may be used with varying widths and heights tuned to the desired spring force. While the mating feature 45 is preferably shown as the annular groove 46 terminating in the outwardly projecting lip 47, many other possible mating features such as apertures or indentations capable of engaging the spring tabs 81 to position the sleeve retainer 80 on the sensor 30 are possible. It will be understood that a person skilled in the art may make these and other modifications to the embodiment shown herein within the scope and intent of the claims.

Figure 7:
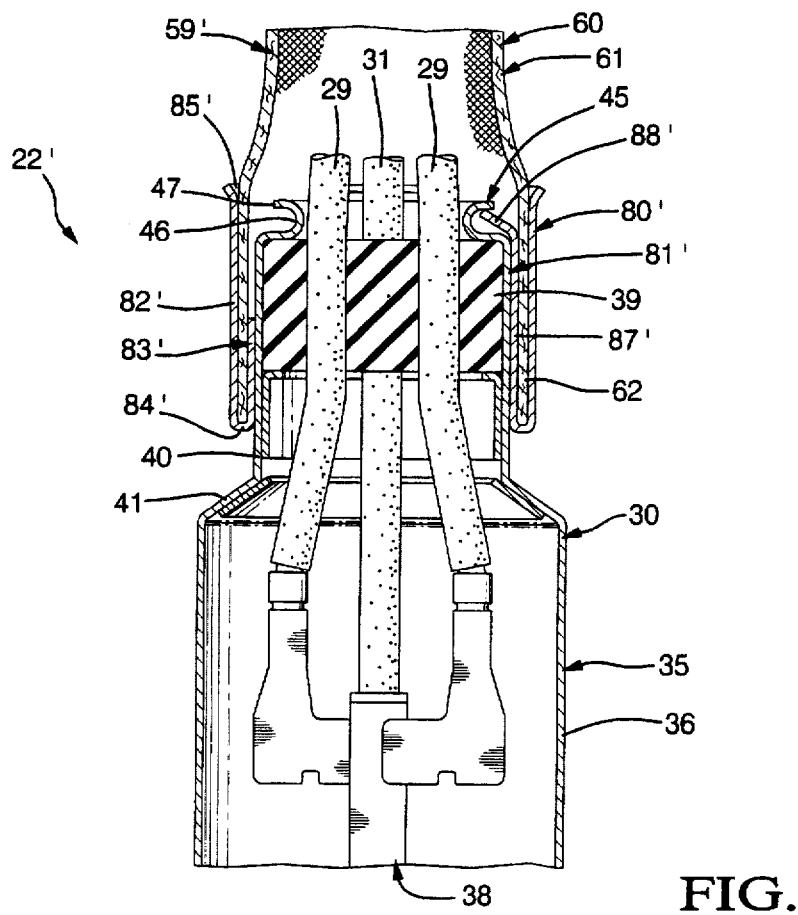
FIG. 7 is a sectional view similar to FIG. 4B, but showing another embodiment of the invention having an alternate sleeve retainer.
Figure 8:
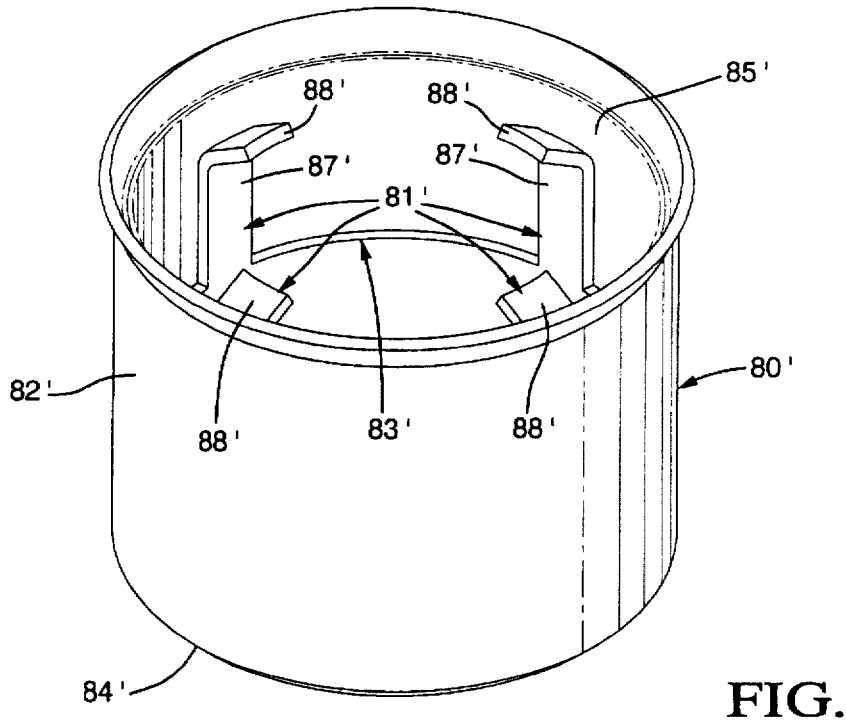
FIG. 8 is a perspective view similar to FIG. 5, but showing the alternate sleeve retainer of FIG. 7.

For example, FIGS. 7 and 8 show another embodiment of the invention in which an alternate sleeve retainer 80' is used. Components similar to those shown in FIGS. 3–6C will be denoted with similar numerals and have the same description. The sensor assembly 22' includes the sensor 30 including the upper shield 35, the harness 60 and the sleeve retainer 80'. The sleeve retainer 80' is preferably a single integral component formed of a metallic material, such as stainless steel for good corrosion resistance. The sleeve retainer 80' generally has a cup-like shape and includes an outer wall 82', and a reverse draw that forms an inner wall 83' and an end wall 84' An upwardly opening circular trough 85' is cooperatively defined between the inner and outer walls 83', 82' with the end wall 84' closing the bottom of the trough 85'. The inner wall 83' includes a plurality of integrally formed, inwardly projecting spring tabs 81' which cooperatively snap the sleeve retainer 80' onto the sensor 30, as described further hereinafter. The spring tabs 81' each extend upwardly from the inner wall 83' and each include an elongated portion 87' and an inwardly bent tip end 88' that snaps into the mating feature 45 on the sensor 30. The outer wall 82' is preferably taller than the inner wall 83' and the spring tabs 81' to provide additional protection around the sleeve end 62 and the sensor wires 29, 31. It will be appreciated that the trough 85' of the sleeve retainer 80' may include slots (not shown) to permit fluids or other contamination to drain out, especially through the end wall Similar to the embodiment shown in FIGS. 3–6C, a harness subassembly 59' includes the sleeve 61 and the sleeve retainer 80'. The trough 85' is initially sized to easily receive the sleeve end 62 of the sleeve 61 therein as shown in FIG. 8, and the sleeve end 62 is axially inserted into the trough 85'. The outer wall 82' of the sleeve retainer 80' is pressed, crimped or otherwise formed so that the sleeve end 62 is pinched between the inner and outer walls 83', 82' of the sleeve retainer 80' and is securely captured in the trough 85' as shown in FIG. 7.

Referring to FIG. 7, it will be appreciated that the sleeve end 62 captured in the sleeve retainer 80' is visually pleasing since the sleeve end 62 is hidden within the sleeve retainer 80' and fraying and unraveling of the sleeve end 62 is virtually eliminated. It will further be appreciated that the harness 60 is also more visually pleasing since the sleeve end 62 does not bunch up upon insertion into the sleeve retainer 80'. Also, the sleeve retainer 80' is more consistently positioned on the sleeve end 62 since only the sleeve retainer 80' and sleeve 61 need be aligned during the pressing or crimping operation.

Referring to FIG. 7, the harness subassembly 59' including the sleeve retainer 80' and the sleeve end 62 are easily snap-fittedly attached to the upper shield 35 of the sensor 30 without the use of tools as follows. The inner wall 83' of the sleeve retainer 80' has a diameter which is preferably sized for surface to surface contact or a slip fit with the outer diameter of the upper portion 40 of the upper shield 35. The slip fit allows the sleeve retainer 80' to easily be manually assembled to the upper shield 35. The sleeve retainer 80' is simply manually moved or pushed in a downward axial direction onto the upper shield 35 such that the spring tabs 81' engage upper shield 35. The elongated portion 87' of the spring tabs 81' easily move past the mating feature 45 including the annular groove 46 and the outwardly projecting lip 47 on the uppermost end of the upper shield 35. Upon further axial movement, the inwardly bent tip ends 88' of the spring tabs 81' then snap into place beneath the outwardly projecting lip 47 of the mating feature 45 and into the annular groove 46 to connect the harness 60 to the sensor 30. The sleeve retainer 80' provides greater flexibility and ease when completing the sensor assembly 22' at the sensor assembly location. Since no tools are necessary, the sleeve retainer 80' and thus the harness 60 can be manually snapped onto the sensor 30 to complete the sensor assembly 22'.

Figure 9:
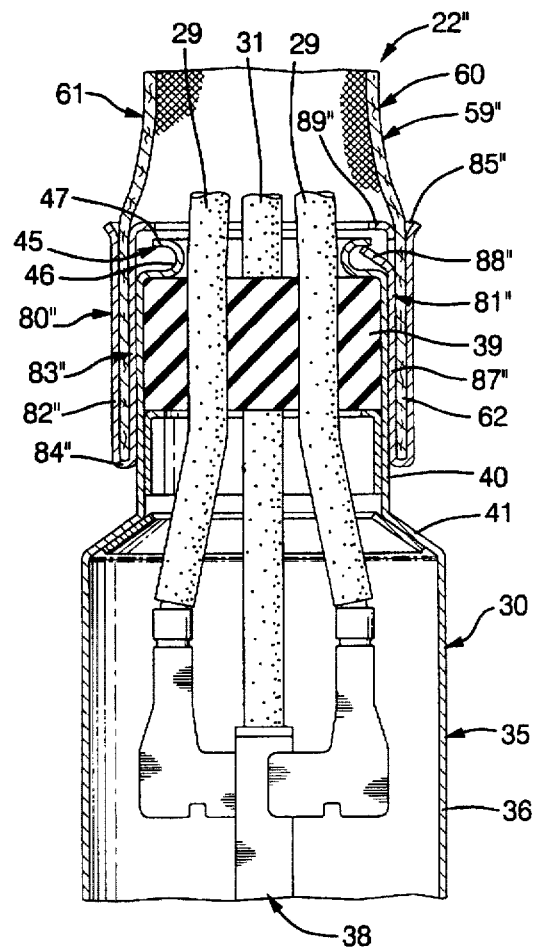
FIG. 9 is a sectional view similar to FIG. 4B, but showing yet another embodiment of the invention having another alternate sleeve retainer.
Figure 10:
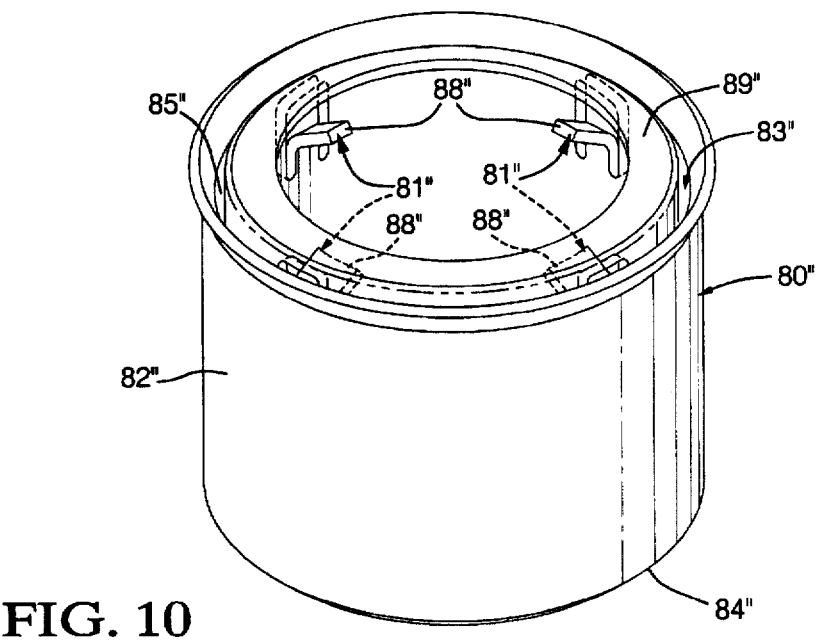
FIG. 10 is a perspective view similar to FIG. 5, but showing the other alternate sleeve retainer of FIG. 9.

As another example, FIGS. 9 and 10 show yet another embodiment of the invention in which another alternate sleeve retainer 80" is used. Components similar to those shown in FIGS. 3–6C will be denoted with similar numerals and have the same description. The sensor assembly 22" includes the sensor 30 including the upper shield 35, the harness 60 and the sleeve retainer 80". The sleeve retainer 80" is preferably a single integral component formed of a metallic material, such as stainless steel for good corrosion resistance. The sleeve retainer 80" generally has a cup-like shape and includes an outer wall 82", and a reverse draw that forms an inner wall 83" and an end wall 84".An upwardly opening circular trough 85" is cooperatively defined between the inner and outer walls 83", 82" with the end wall 84" closing the bottom of the trough 85". The inner wall 83" is approximately the same height as the outer wall 82" and an intermediate portion of the inner wall 83" includes a plurality of integrally formed, inwardly projecting spring tabs 81" which cooperatively snap the sleeve retainer 80" onto the sensor 30, as described further hereinafter. The spring tabs 81" are each preferably cut from the inner wall 83" with a small clearance gap between the spring tabs 81" and the inner wall 83" such that the spring tabs 81" do not bind on the inner wall 83" when snapped onto the sensor 30. The spring tabs 81" each include an inwardly bent tip end 88" that snaps into the mating feature 45 on the sensor 30.

The inner wall 83" further includes an inwardly projecting lip 89" that limits axial movement of the sleeve retainer 80" onto the sensor 30.

Similar to the embodiment shown above, a harness subassembly 59" includes the sleeve 61 and the sleeve retainer 80". The trough 85" is initially sized to easily receive the sleeve end 62 of the sleeve 61 therein as shown in FIG. 10, and the sleeve end 62 is axially inserted into the trough 85". The outer wall 82" of the sleeve retainer 80" is pressed, crimped or otherwise formed so that the sleeve end 62 is pinched between the inner and outer walls 83", 82" of the sleeve retainer 80" and is securely captured in the trough 85" as shown in FIG. 9.

Referring to FIG. 9, the harness subassembly 59" including the sleeve retainer 80" and the sleeve end 62 are easily snap-fittedly attached to the sensor 30 without the use of tools as follows. The inner wall 82" of the sleeve retainer 80" has a diameter which is preferably sized for surface to surface contact or a slip fit with the outer diameter of the upper portion 40 of the upper shield 35. The slip fit allows the sleeve retainer 80" to easily be manually assembled to the upper shield 35. The sleeve retainer 80" is simply manually moved or pushed in a downward axial direction onto the upper shield 35 such that the spring tabs 81" engage upper shield 35. The spring tabs 81" easily move past the mating feature 45 including the annular groove 46 and the outwardly projecting lip 47 on the uppermost end of the upper shield 35. Upon further axial movement, the inwardly bent tip ends 88" of the spring tabs 81" then snap into place beneath the outwardly projecting lip 47 of the mating feature 45 and into the annular groove 46 to connect the harness 60 to the sensor 30. As in all of the embodiments, the sleeve retainer 80" provides greater flexibility and ease when completing the sensor assembly 22" at the sensor assembly location. Since no tools are necessary, the sleeve retainer 80" and thus the harness 60 can be manually snapped onto the sensor 30 to complete the sensor assembly 22".

Figure 11:
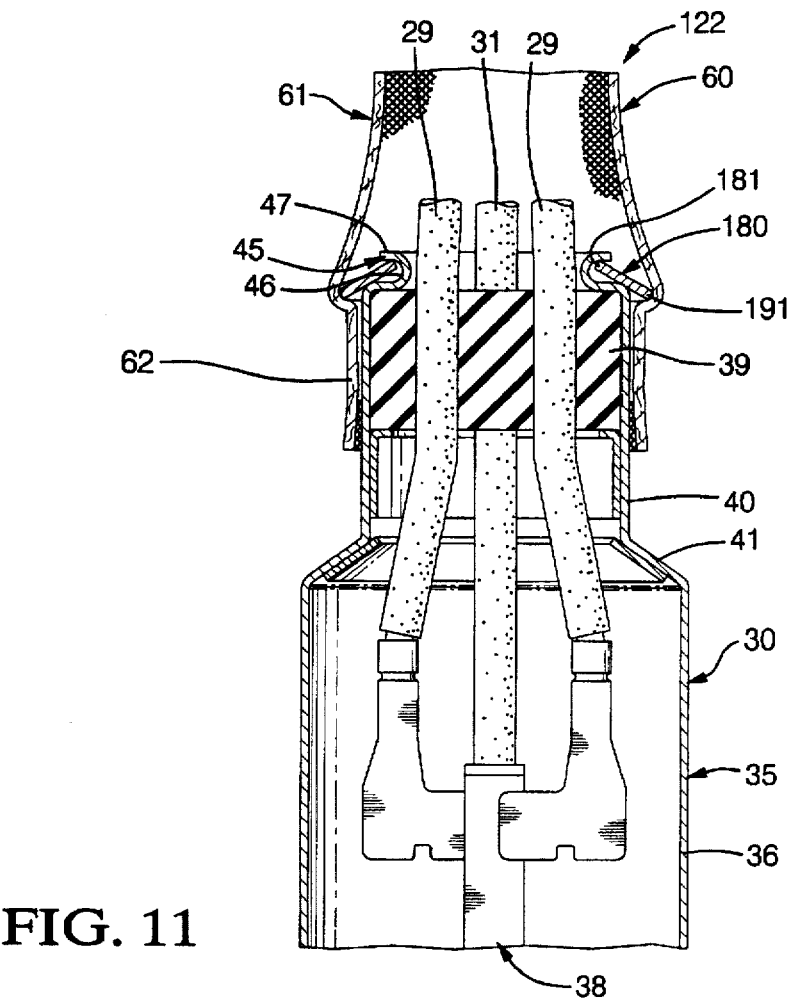
FIG. 11 is a sectional view similar to FIG. 4B, but showing a further embodiment of the invention having yet another alternate sleeve retainer.
Figure 12:
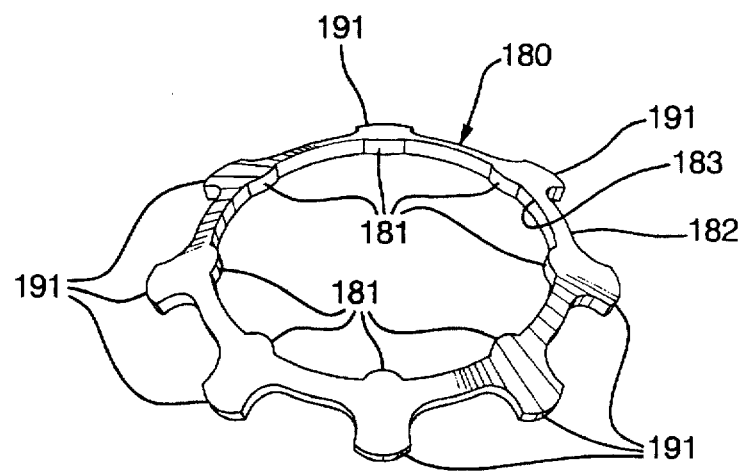
FIG. 12 is a perspective view similar to FIG. 5, but showing the alternate sleeve retainer of FIG. 11.

As yet another example, FIGS. 11 and 12 show a further embodiment of the invention in which an alternate sleeve retainer 180 is used. Components similar to those shown in FIGS. 3–6C will be denoted with similar numerals and have the same description. The sensor assembly 122 includes the sensor 30, the harness 60 including the sleeve 61, and the sleeve retainer 180. The sleeve retainer 180 is preferably a single integral component formed of a metallic material, such as stainless steel for good corrosion resistance. The sleeve retainer 180 generally has a ring-like shape and includes an outer edge 182 and an inner edge 183. The inner edge 183 includes a plurality of integrally formed, inwardly projecting spring tabs 181 which cooperatively snap the sleeve retainer 180 onto the mating feature 45 of the upper shield 35 of the sensor 30, as described further hereinafter. The outer edge 182 includes a plurality of radially outwardly projecting barbs 191 for engaging the sleeve end 62 of the sleeve 61, as described hereinafter.

Referring to FIG. 11, the sleeve 61 and the sleeve retainer 180 are easily attached to the sensor 30 without the use of tools as follows. The sleeve retainer 180 is simply manually moved or pushed in a downward axial direction onto the upper shield 35 such that the spring tabs 181 engage upper shield 35. The flexible spring tabs 181 easily move past the mating feature 45 including the annular groove 46 and the outwardly projecting lip 47 on the uppermost end of the upper shield 35. Upon further axial movement, the inwardly projecting spring tabs 181 snap into place beneath the outwardly projecting lip 47 of the mating feature 45 and into the annular groove 46 to connect the sleeve retainer 180 to the sensor 30. Next, the sleeve end 62 is manually pushed over the sleeve retainer 180 and is caught and held in place by the barbs 191 on the sleeve retainer 180. It will be appreciated that the barbs 191 preferably project in a slightly downwardly direction so that the sleeve end 62 is easier to connect to the sleeve retainer 180 than it is to remove. Since no tools are necessary, the sleeve retainer 180 and thus the harness 60 can be manually snapped onto the sensor 30 to complete the sensor assembly 122. It will further be appreciated that the sleeve end 62 may alternately be connected to the barbs 191 of the sleeve retainer 180 prior to snap-fitted connection of the sleeve retainer 180 to the upper shield 35.

While the present invention has been described as carried out in specific embodiments thereof, it is not intended to be limited thereby, but is intended to cover the invention broadly within the scope and spirit of the claims.

The embodiments of the invention in which an exclusive property or privilege is claimed are defined as follows:

1. A sensor assembly comprising:

a sensor including a mating feature disposed thereon;

a harness having a protective sleeve including a sleeve end; and a sleeve retainer connected to the sleeve end, the sleeve retainer being an integrally formed single component, the sleeve retainer including an integrally formed inner wall, outer wall and bottom wall cooperatively forming an upwardly opening trough defined between the inner and outer walls, the inner and outer walls for movement between a first position in which the sleeve end is insertable into the trough and a second position in which the sleeve end is securely trapped in the trough between the inner and outer walls prior to attachment of the sleeve retainer to the sensor, the sleeve retainer including a plurality of integrally formed inwardly projecting spring tabs positioned on the inner wall and spaced above the bottom wall, the spring tabs adapted to snap-fittedly engage the mating feature on the sensor to connect the sleeve retainer and harness to the sensor when the bottom wall is axially moved below the mating feature on the sensor such that the sleeve retainer extends partially below the mating feature of the sensor;

whereby said integrally formed single component both mechanically retains the sleeve end and provides snap-fitted attachment to the sensor such that upon axial movement of the sleeve retainer over the sensor, the spring tabs snap-fittedly engage the mating feature on the sensor and hold the protective sleeve in position relative to the sensor.

2. The sensor assembly of claim 1 wherein the inner wall is shorter than the outer wall and wherein the spring tabs each extend upwardly from the inner wall and wherein each of the spring tabs includes a flexible upwardly extending elongated portion and an inwardly bent tip end that snaps into the mating feature on the sensor.

3. The sensor assembly of claim 1 wherein the inner wall of the sleeve retainer further includes an uppermost end having an inwardly projecting lip integrally formed thereon and wherein the inwardly projecting lip limits axial movement of the sleeve retainer over the sensor to position the sleeve retainer relative to the sensor and to ensure that the spring tabs engage the mating feature.

4. The sensor assembly of claim 1 wherein the mating feature is an annular groove positioned directly beneath an outwardly projecting lip formed by rolling over an uppermost end of the sensor.

5. A method of assembling a harness having a protective sleeve including a sleeve end to a sensor, the method comprising the steps of:

providing a sensor having a mating feature located thereon;

providing a sleeve retainer having an integrally formed inner wall, outer wall and bottom wall forming a trough, the inner wall having a plurality of integrally formed inwardly projecting spring tabs thereon spaced above the bottom wall;

attaching the sleeve retainer to the sleeve end by placing the sleeve end within the trough and crimping the inner and outer walls together prior to attachment of the sleeve retainer and harness to the sensor; and axially moving the sleeve retainer including the attached sleeve end over the sensor and snapping the inwardly projecting spring tabs into the mating feature to attach the harness to the sensor.

6. A sensor assembly comprising:

a sensor including a mating feature disposed thereon;

a harness having a protective sleeve including a sleeve end having an interior; and a sleeve retainer connected to the sleeve end, the sleeve retainer having a generally planar ring-like shape including an inner edge and an outer edge, the inner edge including a plurality of integrally formed, inwardly projecting spring tabs adapted to snap-fittedly engage the mating feature on the sensor to connect the sleeve retainer and harness to the sensor, and the outer edge including a plurality of radially outwardly projecting barbs for engaging the interior of the sleeve end to attach the sleeve retainer to the sleeve end;

whereby upon downward axial movement of the sleeve retainer over the sensor, the spring tabs snap-fittedly engage the mating feature on the sensor and hold the protective sleeve in position relative to the sensor.

7. The sensor assembly of claim 6 wherein the outwardly projecting barbs on the sleeve retainer project in a generally downward direction for resisting removal of the sleeve end from the sleeve retainer after attachment thereto.

* * * * *